J. PLANT.
Lock Hinge.
No. 94.
Reissued May 15, 1847.
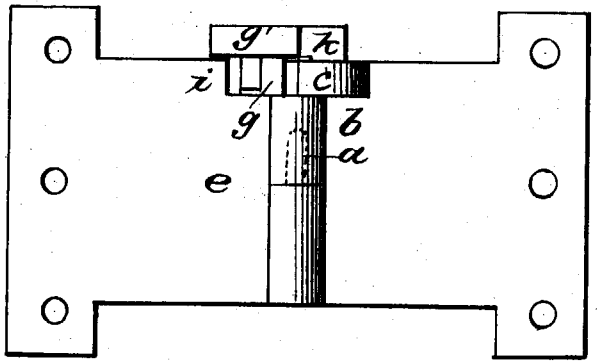
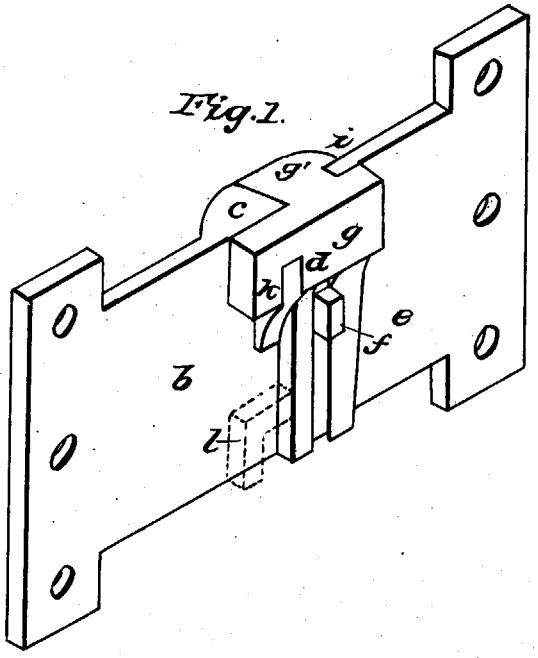
N. PETERS, Photo-Lithographer, Washington, D. C.

UNITED STATES PATENT OFFICE.

JOHN PLANT, OF WASHINGTON, DISTRICT OF COLUMBIA.

IMPROVEMENT IN HINGES FOR BLINDS, &c.

Specification forming part of Letters Patent No. 5,080, dated April 24, 1847; Reissue No. 94, dated May 15, 1847.

*To all whom it may concern:*

Be it known that I, JOHN PLANT, of the city of Washington, District of Columbia, have invented a new and useful Improvement in Butt-Hinges for Window-Blinds and other Outside Shutters; and I do hereby declare that the following is a full, clear, and exact description of the principle or character which distinguishes it from all other things before known, and of the manner of making, constructing, and using the same, reference being had to the accompanying drawings, making part of this specification, in which—

Figure 1 is an isometrical projection of the hinge; Fig. 2, an elevation of the side opposite to the one shown in Fig. 1.

The same letters indicate like parts in all the figures.

The nature of my improvement consists in affixing a sliding or vibrating bolt to the hinge at or near its joint, so constructed as to embrace and sustain both parts of the hinge when open, as shown in the drawings, and thus hold the blind back without bringing any strain upon the pivoting-pin, by which its liability to break is obviated and a perfect, cheap, and compact hinge is formed.

The construction of my improved hinge is as follows: The two halves of the hinge are made similar to those in common use, except the pivoting-pin *a*, (shown in Fig. 2 by dotted lines,) which does not extend up into the movable half *b* of the hinge as far as usual. At the top of the joint there is a small projecting piece, *c*, intended to strengthen the hinge and afford a firm bearing for the bolt about to be described. At that point on the side opposite to the projection *c* there is a stud, *d*, standing out from the back of the movable half of the hinge a little below the upper edge thereof, as is clearly shown in Fig. 1, and, if thought necessary, a similar one may be placed at the bottom; but this latter one is not represented. On the stationary part *e* of the hinge there is a projection, *f*, on which a bolt, *g*, slides up and down; or the bolt may have a horizontal arm extending out to one of the screws, on which it turns instead of sliding. This modification is obvious and needs no illustration. The top part of this bolt *g* projects forward, and when down, as shown in Fig. 1, rests in a notch, *h*. (Represented in Fig. 2.) In the upper edge of the hinge *e* the end of this projection farthest from the joint has a notch in it, so as to receive and embrace a portion, *i*, of the upper edge of the stationary part of the hinge. On the side of the bolt next to the joint a stout hook, *k*, is formed, that hooks over the stud *d*, above named, on the movable half *b*, and securely holds it open, the projection *g'* being at the same time brought down in contact with *c* on the opposite side and the blind fastened open. By simply raising the bolt, which is done by pressing the thumb under the projection *g*, the hinge is freed, and the blind can be closed. As an additional security a second hook may be added to the bolt *g*, as shown by red lines at *l* in the drawings, Fig. 1, which can be made to embrace a second stud on the movable part *b*, as above named; but in most cases one will be found sufficient for all practical purposes by arranging the bolt with the parts of the hinge, as above described.

It is obvious that great strength is attained with more compactness than in any of the other hinges for similar purposes now in use by shutting a portion of the bolt down directly into the joint, while it is firmly secured to one side and hooks onto the other and makes a perfect fastening.

Having thus fully described my improvement, what I claim as my invention, and desire to secure by Letters Patent, is—

The combination of the bolt with the hinge in such manner that a portion of it enters between the two parts of the hinge at the joint, so as to brace on one side, while the hook on the bolt firmly secures it on the other side, the whole being constructed substantially in the manner and for the purpose described.

JOHN PLANT.

Witnesses:

D. SAUNDERS,

J. J. GREENOUGH.